United States Patent [19]  
Seidel et al.

[11] 4,023,960  
[45] May 17, 1977

[54] PROCESS FOR CLEANING WASTE GASES FROM SINTERING PLANTS

[75] Inventors: Horst Seidel; Horst Dahlmann, both of Bischofsheim; Rolf Bothe, Falkenstein; Hermann Schmidt, Bergen-Enkheim, all of Germany

[73] Assignee: Metallgesellschaft Aktiengesellschaft, Frankfurt am Main, Germany

[22] Filed: May 22, 1975

[21] Appl. No.: 579,937

Related U.S. Application Data

[63] Continuation of Ser. No. 408,799, Oct. 23, 1973, abandoned.

[30] Foreign Application Priority Data

Oct. 25, 1972 Germany ............ 2252245

[52] U.S. Cl. .................. 75/5; 266/135
[51] Int. Cl.$^2$ .................. C22B 1/212
[58] Field of Search ............ 75/3, 5, 4

[56] References Cited

UNITED STATES PATENTS

| 2,768,890 | 10/1956 | Cover | 75/5 |
| 2,931,718 | 4/1960 | Greaves | 75/5 |
| 3,172,754 | 3/1965 | Anthes et al. | 75/5 |
| 3,203,782 | 8/1965 | Meyer et al. | 75/5 |
| 3,332,770 | 7/1967 | Wendt, Jr. et al. | 75/5 |
| 3,333,951 | 8/1967 | Ban | 75/5 |
| 3,501,288 | 3/1970 | Krainer et al. | 75/5 |
| 3,849,115 | 11/1974 | Ban | 75/5 |

FOREIGN PATENTS OR APPLICATIONS

| 1,239,066 | 7/1960 | France | 75/5 |
| 927,199 | 5/1963 | United Kingdom | 75/5 |
| 573,539 | 11/1945 | United Kingdom | 75/5 |

*Primary Examiner*—L. Dewayne Rutledge  
*Assistant Examiner*—Michael L. Lewis  
*Attorney, Agent, or Firm*—Parmelee, Miller, Welsh & Kratz

[57] ABSTRACT

A process is disclosed for cleaning waste gases generated in an at least partially covered movable grate-type sintering line, said sintering line comprising an ignition zone, a sintering zone and a burning zone, wherein waste gases generated in the burning zone are returned to the sintering zone, passed through the sinter charge and at least those waste gases emerging from the last third of the sintering zone are scrubbed after passage through the charge.

5 Claims, 7 Drawing Figures

PROCESS FOR CLEANING WASTE GASES FROM SINTERING PLANTS

This is a continuation of application Ser. No. 408,799 filed Oct. 23, 1973, now abandoned.

BACKGROUND OF THE INVENTION

This invention relates to a process of cleaning waste gases generated in an at least partially covered movable grate-type sintering line, said sintering line comprising an ignition zone, a sintering zone and a burning zone.

Waste gases generated in sintering installations are known to contain pollutants other than dust. In for example, iron ore sintering plants, compounds of lead, tin, zinc, arsenic, cadium, copper, sulfur, chlorine, fluorine, nitrogen oxides and the like as well as hydrocarbons are generated. These pollutants originate both from the ore mixture itself and from the solid, liquid or gaseous fuels used to sustain the sintering process.

It appears likely that future environmental regulations governing the discharge of solid and gaseous pollutants into the atmosphere will become more and more strict and lower and lower allowable limits on such discharges will be set.

Present clean air regulations in, for example, Germany prescribe that dust levels in waste gases not exceed a value of less than 150 mg/Nm$^3$. For other pollutants, such as, for example, gaseous emissions of $SO_2$, fluorine, nitrous oxide and other components of the waste gas, limiting values which are dependent upon local conditions are established. The VDI-Guideline 2095 (page 9) sets, for example, minimum flue heights as a function of the $SO_2$ emission in kg/h as an economically feasible solution. However, the problem of the elimination of said pollutants is not solved by great flue heights. They are only distributed over a greater space and thereby are reduced in their local concentration.

In a conventional sintering process having a single suction system over the entire sintering line, a very large quantity of waste gas having an average temperature of approximately 120° C. to 180° C. is ejected into the atmosphere by dust collectors.

The composition of the waste gases, as well as the dust, is variable in the longitudinal direction of the sintering line from the ignition to the discharge, and different pollutants tend to form in specific sections of the suction apparatuses in the normal operation of the sintering plant.

With the present requirements for dust removal, electrostatic precipitors are used for fine-grained dust and mechanical dust collectors are used for coarse-grained dust. If, for example, the removal of $SO_2$ is also necessary for the entire waste gas of such sintering installations after the dust removal, the operating and investment costs become relatively high.

OBJECTS OF THE INVENTION

It is therefore an object of this invention to provide a technically simple and economical method of removing pollutants from waste gases generated in a sintering operation, which process is sufficiently flexible so as to adapt to increasingly stricter standards governing allowable discharges of pollutants into the atmosphere.

DESCRIPTION OF THE INVENTION

The foregoing objects and others which will become apparent from the following description are accomplished in accordance with the process of the invention by returning waste gases generated in the burning zone of the sintering line back to the sintering zone, passing the gases through the sinter charge and scrubbing or washing at least that portion of waste gases emanating from the last third of the sintering zone after the gases have passed through the sinter charge. The waste gases generated in the burning zone and returned to the sintering zone contain at least about 16 percent oxygen.

According to the instant process, the sintering line comprises three sections or zones, i.e. an ignition zone, a sintering zone and a burning zone, the sinter charge being passed consecutively through these zones via movable or traveling grate means. The sinter charge is ignited by conventional means in the ignition zone and passes into the sintering zone which is defined as that section of the sintering line wherein the sinter front passes through the charge mixture and wherein substantially all of the moisture in the charge mixture is expelled, the average waste gas temperature in this zone being about 50° C. to 70° C. Normally, the sintering zone comprises about 60 to 75 percent of the length of the sintering line. Following the sintering zone is the burning zone in which zone the sintering front reaches the grate (burn-through point) and extends to the point of discharge of the sintered mixture, or if a cooling zone is provided on the sinter line to the beginning of the cooling zone. The waste gas temperature reaches a maximum shortly before discharge or passage of the sintered mixture into the cooling zone.

Washing or scrubbing is further understood to mean the extensive separation or absorption of gaseous pollutants, such as, for example, sulfur dioxide, fluorine, nitrous oxide and the like. Conventional process, usually wet processes, and apparatus are employed.

In the burning zone, the oxygen content of the entering air is not consumed as extensively by the sintering process as it is in the sintering zone. The process gas of the burning zone on the average has an oxygen content of from about 16% to 20%, as compared with about 8% to 12% in the waste gas from the sintering zone. The oxygen content of the burning zone is thus still completely suitable for use as process gas in the sintering zone. The process gas of the burning zone which is directed back into the hood over the sintering zone flows through the charge and is simultaneously precleaned in the sintering zone because of the slight permeability of the sinter mixture.

Within the sintering zone, the gaseous pollutants, for example, reach their maximum value approximately in the last third of the sintering zone. If the goal, for example, is not a complete $SO_2$ removal, it suffices to subject only the waste gas of the last part of the sintering zone to a scrubbing or washing. Thereby, about 60% to 90%, for example, of the gaseous pollutants which are formed in the burning zone reach the sintering zone by means of the return of the process gas of the burning zone to the sintering zone. The two waste gas partial flows, the dedusted partial flow from the front part of the sintering zone and the washed part of the waste gas from the last third of the sintering zone, are mixed with each other and are directed into the flue. In some cases, such a mixing is completely sufficient for fulfilling current regulations relative to the dust content in the waste gas and for guaranteeing, moreover, an about 60% to 90 % removal of the gaseous pollutants. Such waste gas cleaning is particularly advantageous, since only about 20% to 40% of the total waste gas quantity of the sintering and burning zones must be washed, and the minimum flue height can be greatly reduced.

In those cases in which the pollutants are distributed over the greatest part of the sintering zone or substantially complete removal is necessary, the entire waste gas of the sintering zone may be washed according to another embodiment of the invention.

With suitably designed scrubbers, the waste gas can be de-dusted simultaneously and the gaseous pollutants may be removed both from the burning zone, as well as from the sintering zone. Corresponding to the reduced waste gas quantity, only about 50% of the effective total waste gas volume from the sintering and burning zones has to be washed.

According to another preferred embodiment of the invention, the waste gas may be directed through a dust collector before scrubbing.

In order to reduce the load on the scrubber and to decrease the slurry formation in the waste gas cleaning, it is advantageous to use a dust collector for example, a mechanical dust collector. This is particularly the case if the entire waste gas of the sintering section is to be scrubbed. Electrostatic precipitators are used, if the pressure loss of the cleaning installation is to be kept small. The danger of falling below the acid dew point is avoided by the introduction of a regulated partial gas flow of the process gas for the electro-filtering. Simultaneously, an optimum waste gas conditioning with respect to the electric dust resistance is achieved.

According to another preferred embodiment of the invention, the waste gas partial flow which originates from the last part of the sintering zone is first scrubbed and is mixed with the remaining waste gas flow of the sintering section, as well as with a partial flow of the process gas from the end of the burning zone, and is introduced to an electrostatic precipitator.

With the standard arrangement of electrostatic precipitators, the waste gas temperature is about 120° C. to 180 ° C. with a waste gas dew point of about 40° C. as a function of the process technique conditions, such as bed height and belt speed. With the suggested arrangement there results a waste gas having a temperature of about 110° C. with a waste gas dew point of about 50° C. as compared with the foregoing. With respect to the specific electric dust resistance much more favorable conditions for precipitation exist for the last-named conditions, as is known. Thus, an improvement in the precipitation efficiency of electrostatic precipitators is achieved by said arrangement. Thus, the electrostatic precipitator can be dimensioned specifically smaller for said reasons. With the production of highly basic sinter, the use of electro-filters has not been possible due to the high electric dust resistance. According to the new arrangement, however, the electric dust resistance is reduced to such an extent that electro-filters can be used.

According to another preferred embodiment of the invention, the sinter may be cooled with the scrubbed waste gas.

In those cases in which the sinter is finally cooled at the sinter zone on the sintering apparatus, it is particularly advantageous to introduce the entire scrubbed and cooled waste gases of the burning zone behind the scrubber by means of a hood to the cooling section of the sintering apparatus. Moreover, the waste gases are heated by the cooling of the hot sinter to such an extent that a conditioning of the waste gas is likewise achieved for the electrostatic precipitators which are arranged behind the cooler. It is known that the specific electric dust resistance passes a minimum in ohm · cm as a function of the temperature (see: Archiv fuer das Eisenhuettenwesen, no. 4, 1961, pages 221 – 224).

BRIEF DESCRIPTION OF THE DRAWINGS

The invention is described in more detail in the following examples and with reference to the following drawings.

The remaining drawings are schematic representations of various embodiments of the process according to the invention wherein the waste gas of the burning section is returned to the sintering section.

Figure 2:
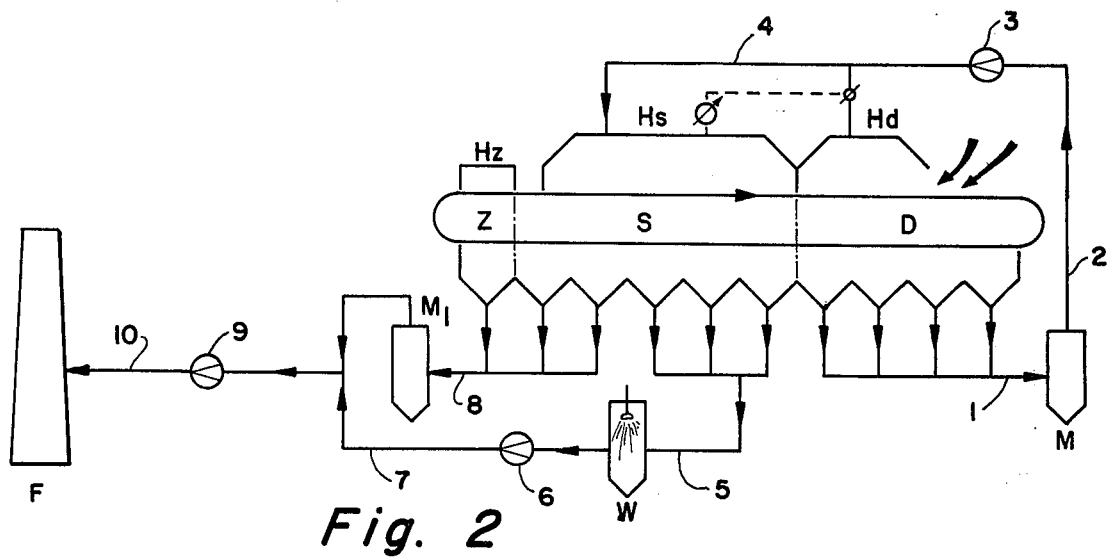

FIG. 2 represents scrubbing of a partial gas flow of the sintering section.

Figure 3:
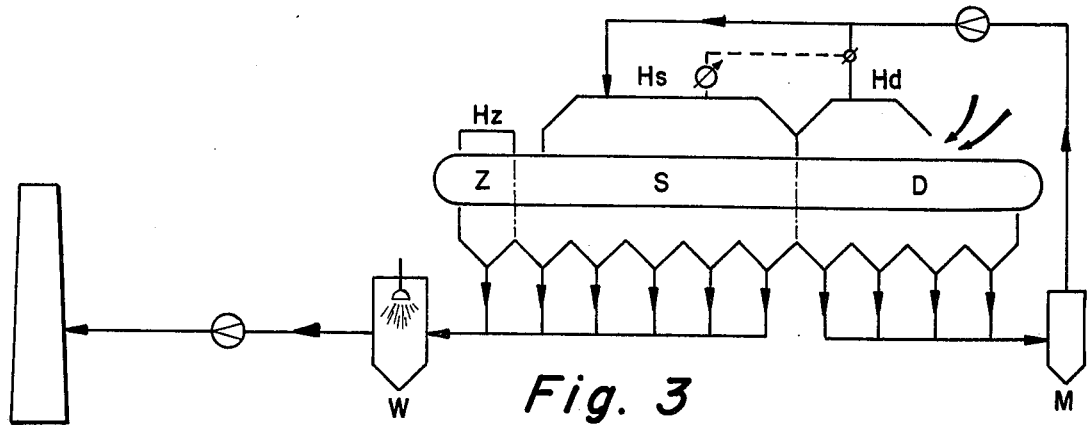

FIG. 3 represents scrubbing of the entire waste gas of the sintering section.

Figure 4:
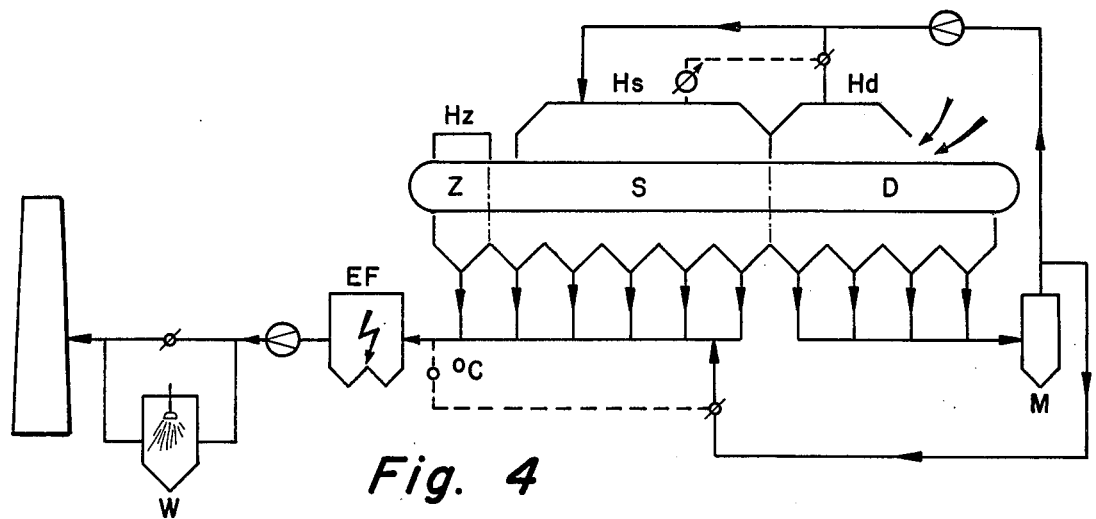

FIG. 4 represents mixing of a hot partial gas flow from the last part of the burning section with the waste gas of the sintering section, dust removal in an electrostatic precipitator, and subsequent scrubbing.

Figure 5:
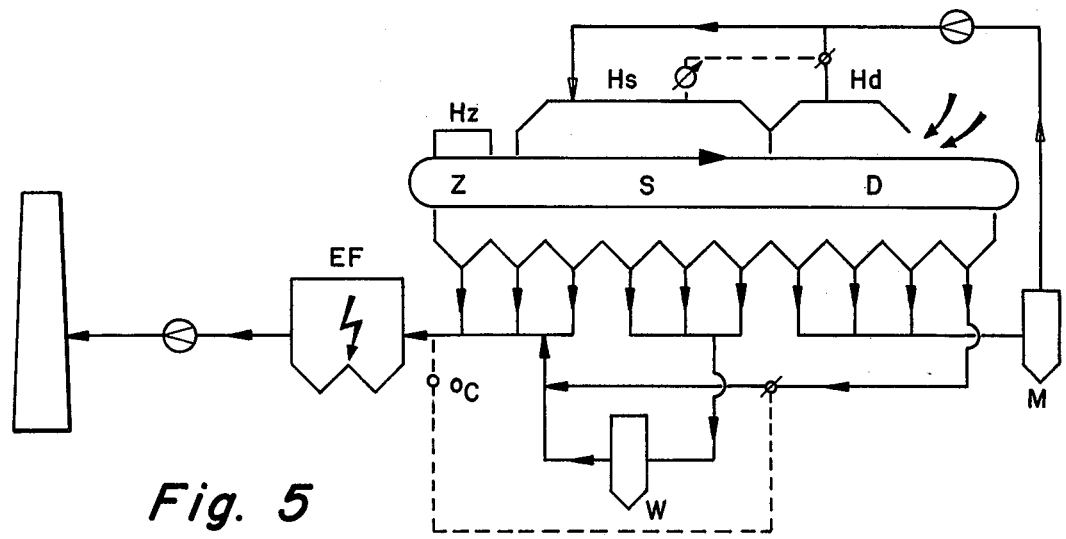

FIG. 5 represents scrubbing of a partial gas flow of the sintering section, mixing of the scrubbed gas with the unscrubbed gas of the sintering section and a partial flow from the last section of the burning zone, removal of dust from the mixture in an electrostatic precipitator.

Figure 1:
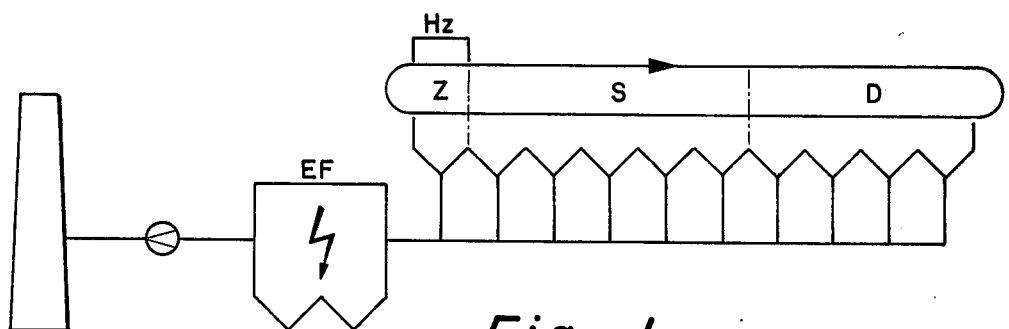
FIG. 1 is a schematic representation of a conventional sintering process wherein the entire waste gas is cleaned in an electrostatic precipitator.
Figure 6:
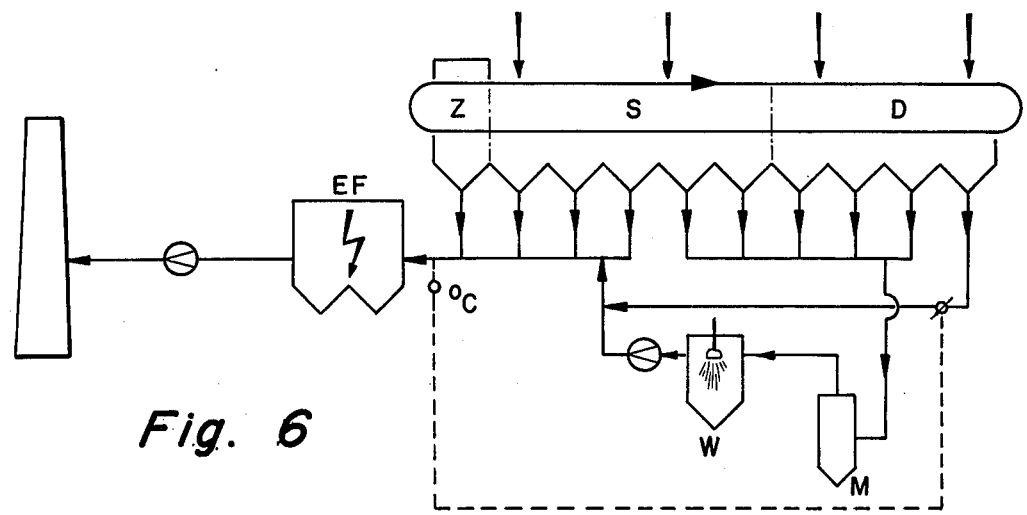

FIG. 6 represents an arrangement similar to that shown in FIG. 1, scrubbing of a partial flow of the burning section, mixing of the scrubbed gas with the remaining gas of the burning section and the waste gas of the sintering section before the final electrostatic precipitation.

Figure 7:
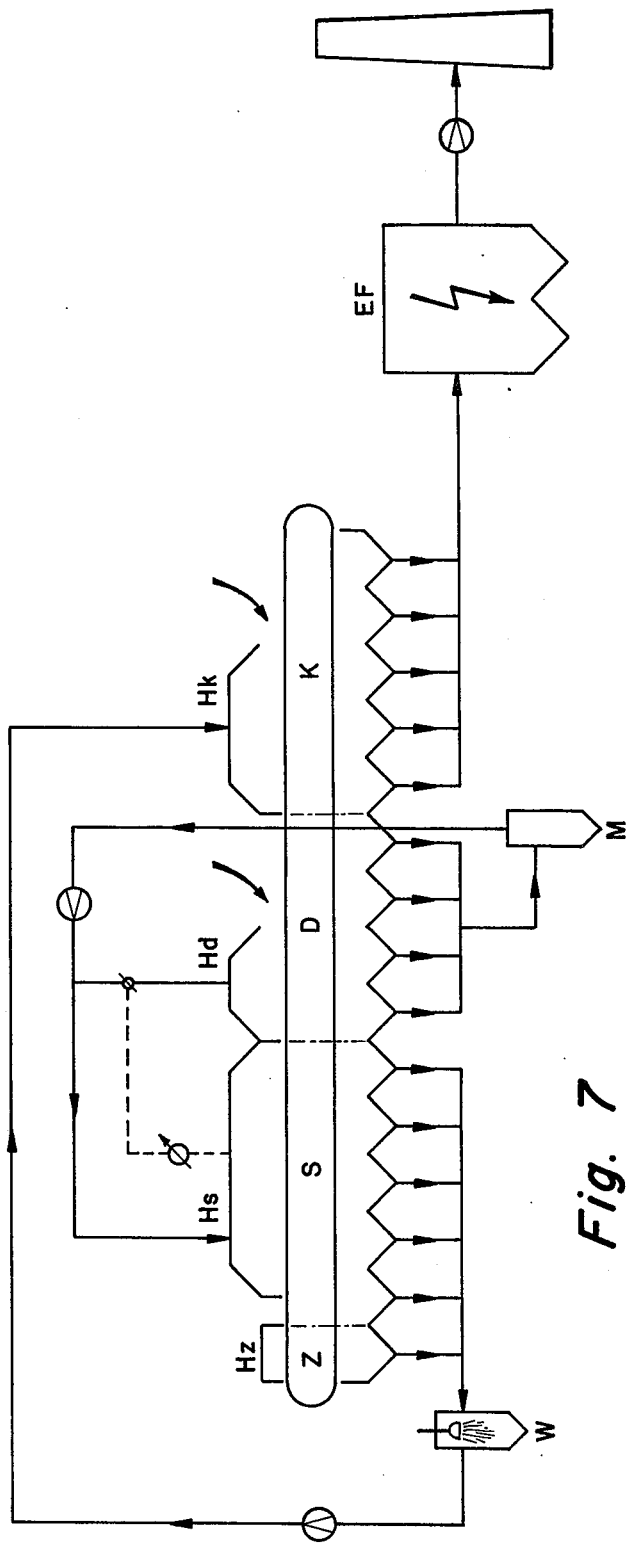

FIG. 7 represents scrubbing of the waste gas of the sintering section and use of the scrubbed and cooled waste gas for the cooling of the hot sinter in a cooling section with subsequent electrostatic precipitation.

DETAILED DESCRIPTION OF THE PREFERRED EMBODIMENT

In FIGS. 1 to 7, the ignition zones are designated as Z and the ignition hoods as $H_z$, the sintering zones are designated as S and the covering hoods as $H_s$; the burning zones are designated as D and the covering hoods as $H_d$; the cooling zone is designated as K and the covering hood as $H_k$. Mechanical precipitators, such as cyclones and the like, are designated as $M_1$ and M; electrostatic precipitators are designated EF, and scrubbers and absorbers for the elimination of pollutants are designated W.

It is customary to introduce the air which is sucked by the traveling grate of a sintering apparatus by means of suction boxes and a common waste gas line to an electrostatic precipitator (FIG. 1). Corresponding to the different temperatures, moisture contents and dust contents of the waste gas in the individual suction boxes of the sintering apparatus, the cold moist waste gases of sintering zone S are mixed with the hot dust-containing gases of the burning zone D. Thereby a waste gas, which is loaded with dust and gaseous pollutants, is produced. It has an average temperature of about 120° C. to 180 ° C., preferably about 140° C. to 160 ° C., a dew point of about 40° C. and, for example, an $SO_2$-content of about 1.5g/Nm$^3$ and more. This waste gas is de-dusted only in electrostatic precipitators at present and is discharged in a connecting high waste gas flue for the reduction of the pollutant concentration in the environment into the atomsphere.

With a high basicity of the sinter mixture, waste gases at temperatures of 120°C. to 180°C. or 140°C. to 160°C. can be cleaned only with great difficulty. At these temperatures, the operation of an electrostatic precipitator is often disturbed, the degree of separation decreases and the requirements for the degrees of cleaning the waste gas can no longer be fulfilled without an enlargement of already large electro-filters to an even greater extent or without conditioning the waste gas for the electro-filter.

According to the invention the problem is solved by the fact that according to FIGS. 2 to 6 the waste gas which differs physically with respect to temperature, moisture, dust content and, for example, the $SO_2$ content as the main emittent of polluting agents, is treated separately in the individual blowers or groups of blowers. Here the goal is that of reducing the quantity of waste gas as much as possible on the one hand and that of removing the pollutants during the waste gas cleaning on the other hand and, if electrostatic precipitators are used, conditioning the waste gas so that favorable precipitation conditions exist with respect to the electric dust resistance so that the electrostatic precipitator can be kept small.

In order to achieve as slight a waste gas quantity as possible and simultaneously to remove the pollutants with or without electrostatic precipitators, the hot dust-containing waste gas of burning zone D is directed into hood $H_s$ of sintering zone S and is sucked through the charge. For this it is necessary to design the burning zone D large enough so that the oxygen content of the waste gas is at least about 16% and still suffices for allowing the sintering of the ore mixture in the sintering zone S to take place without impairing the efficiency and quality. If the sintering zone S is selected so large that the waste gas quantity of said zone corresponds to about 70% to 130% of the process air quantity which forms in the burning zone, these prerequisites are fulfilled. The waste gas quantity of the burning zone D is directed back into a hood $H_s$ which is arranged above the sintering apparatus and follows the ignition oven. In order to prevent hot process air from being blown into the sintering building in the case of permeability variations in the sinter mixture, provision is made for a hood pressure regulator. The process air which is provided in the sintering zone may not be greater than the process air which is exhausted in said zone and, of course, under consideration of all operating conditions, including of course, that of varying permeability. In order to achieve this, provision is made that the excess of air is discharged or the deficiency is covered with an excess or deficient supply of gases from the burning zone. This is done with the use of control devices in or from a hood $H_d$ which is connected to the sintering zone S. This is possible with the simplest hood pressure controls. These hoods are designed such that hood $H_s$ of the sintering zone covers a face of the sintering apparatus through which 100 % of the waste gas of the burning zone D can be sucked with normal operation. The hood $H_d$ of the burning zone D covers a face of about 25% to 35% of the hood $H_s$ of the sintering zone S.

Naturally the air which is needed for sintering must be introduced to the sintering apparatus. The air reaches sintering zone S partially by means of the transfers fo the waste gases from the burning zone D into the sintering zone S and is still introduced in part in the last zone of the sintering apparatus. This additional process air can be sucked or forced through this zone of the sintering apparatus. If the sinter is cooled on the sintering machine, the waste gas of the sintering zone S may be utilized as cooling air for the cooling zone K.

FIGS. 2 to 6 illustrate how the problem of purifying the waste gas is solved. Hereby the individually selected process is established according to the required degree of purity and the investment requirements and the necessary energy expenditure, for example, pressure loss of a scrubber.

According to FIG. 2, the process gas from the burning zone D is sucked out of the suction boxes into duct 1 and passed into the mechanical precipitator M where it is 3 and duct 4 into hood Hs over the sintering zone S. Only a partial flow of the waste gas from the sintering zone S is scrubbed. This partial flow is established according to the maximum pollutant emission and its distribution over the sintering apparatus. In most cases, the maximum is generally in the last third of the sintering zone. Therefore, the suction boxes of this part of the sintering zone are connected with each other by duct 5 and are directed to a scrubber W, for example, for the removal of $SO_2$ or fluorine. Thereby, the polluting agents which occur at the beginning of the sintering zone and the polluting agents which occur in part in the burning zone are not picked up. However, since these portions are only slight before and behind the optimum pollutant emission, about 60 % to 90% of the total pollutants which occur are picked up in this part of the sintering zone and at least up to about 90% are removed in the subsequent scrubbing. Only about 20% to 30% of the total waste gas quantity, for example according to FIG. 2, is scrubbed and thereby about 50% to 80% of the polluting agents are removed. Thereafter the gas is passed through fan 6 and duct 7. The remaining waste gas of the sintering zone is passed through duct 8 and roughly de-dusted in a mechanical precipitator, such as, for example, a cyclone, and both partial flows are directed in the mixed state through fan 9 and duct 10 to the waste gas flue F.

In many cases in which not too high requirements for de-dusting and elimination of pollutants are set, this cleaning suffices. It is particularly characterized by the fact that the entire waste gas of the sintering apparatus is cleaned with relatively small cleaning apparatuses. The apparatuses for de-dusting and scrubbing must be designed only for about one-fourth of the entire waste gas quantity of the sintering line.

For example, with an hourly $SO_2$ discharge of approximately 1000 kg/h without the scrubbing of the gas according to FIG. 2, a minimum flue height of 89 m is necessary according to the VDI Guideline 2095, page 9, FIG. 2. Said flue height is reduced to 68 m by the scrubbing with a 50% $SO_2$-removal and to 52 m with an 80% $SO_2$-removal. Today minimum flue heights of 200 m are not rare in practice.

If very high requirements are set for the elimination of the pollutants and lesser ones are set for the de-dusting, it is advantageous to work according to FIG. 3 and to scrub the entire waste gas of the sintering zone. Thereby the polluting agents of the entire sinter line are picked up. However, the de-dusting is dependent upon the pressure loss which has a very great influence on the economy of the entire process. The dust which is deposited in the scrubbers increases the slurry circulation or the problems of slurry elimination. Thus, it may be more advantageous to work according to FIG. 4 by connecting an electrostatic precipitator before the scrubber and admixing a partial flow of hot gas from the burning zone with the waste gas of the sintering zone in order to prevent a corrosion in the electro-filters due to the cold and almost saturated waste gases of the sintering zone. Another advantage of this arrangement is that the scrubber can be placed out of operation by a by-pass switching, if the pollutant emission of the sintering machine is slight.

In many cases it is sufficient to operate according to FIG. 5 by scrubbing only the gas flow which occurs in the last part of the sintering zone and by mixing together with, for example, a partial gas flow of hot gas from the burning zone with the residual gas and the scrubbed gas of the sintering zone and directing same to the electrostatic precipitator.

If the sinter is cooled on the belt as shown in FIG. 7, the scrubbed cold gas is directed back to the cooling zone of the sinter line for the cooling of the hot sinter and the heated waste gas is cleaned in an electrostatic precipitator.

In those cases in which it is necessary with sintering belt de-dusting which is standard today to undertake something additional for the elimination of pollutants and return of the waste gases of the burning zone to the sintering zone is not possible, it is advantageous to work according to FIG. 6. Particularly if the maximum of the pollutant emission is located more toward the burning zone, the discharge units with the maximum pollutant content will be made into one group; they will be subjected to a preliminary de-dusting and introduced to a scrubber. This partial gas flow of the sintering machine will be mixed with the remaining waste gas of the burning zone and the sintering zone and will be directed into an electrostatic precipitator for the very fine cleaning. Moreover, a part of the hot and dust-containing waste gas of the burning section is cooled. For the deposition in the electrostatic precipitator, especially favorable precipitation conditions are provided thereby with respect to temperature, mositure and waste gas quantity.

It is, of course, to be understood that the arrangements herein described and illustrated as to the quantities of waste gases subjected to cleaning and as to the types of gas cleaning apparatuses employed are exemplary and many variations would be apparent to one skilled in the art, the essence of the invention residing in returning the waste gases generated in the burning zone back to the sintering zone and passing these gases through the sinter charge prior to scrubbing or otherwise cleaning the same.

The invention is further illustrated by the following examples employing the embodiments of the invention represented in FIGS. 2 to 7 as compared with the conventional system represented in FIG. 1.

EXAMPLES

The use of the process of the invention according to the embodiments of FIGS. 2 to 7 for an iron ore sintering installation with a 400 m$^2$ suction face corresponding to a specific sintering capacity of 40 t/m$^2$ . 24 hours is shown in the tabulation of data. The examples are compared with each other numerically.

The date is based on a total waste gas quantity of 22,400 Nm$^3$/minute with an $SO_2$ pollutant content of 1.5 g/Nm$^3$, whereby about 2000 kg/h of $SO_2$ are discharged, if the waste gas is released into the atmosphere without cleaning. The table contains the relative size of the scrubbers or electro-filters, in addition to the waste gas quantity, waste gas temperature and pressures, $SO_2$ contents, dust contents, as related to the standard sintering process according to FIG. 1.

From the examples, it is readily seen that the problem of the elimination of pollutants is solved according to the process of the invention in an economical and technically simple manner without great investments. The process has the advantages that the quantity of the waste gas which is to be cleaned is greatly reduced, whereby correspondingly smaller apparatuses for de-dusting, as well as for scrubbing or absorption, are used. Smaller waste gas flues are possible due to the removal of gaseous pollutants, for example, $SO_2$. The process can be adapted flexibly to the operating conditions of a sintering apparatus. Electrostatic precipitators can be made smaller, because a conditioning of the waste gases takes place simultaneously due to the process, so that optimum deposition conditions exist for the electrostatic precipitator. According to the figures, only fine dusts which contain metallically valuable compounds, such as Pb, Zn, Cu, and the like which can be economically treated and recovered later, for example in a lead plant, are introduced to the scrubbers.

| Process According to Figures: | Treatment of Waste Gases According to the Process Illustrated in FIGS. 1 to 7 | | | | | | |
|---|---|---|---|---|---|---|---|
| | | 1 | 2 | 3 | 4 | 5 | 6 | 7 |
| Waste Gas Quantities: | | | | | | | | |
| Sintering Zone Z+S | Nm$^3$/min | 22 400 | 13 000 | 13 000 | 13 000 | 13 000 | 13 000 | 13 000 |
| Burning Zone D | Nm$^3$/min | | 9 400 | 9 400 | 9 400 | 9 400 | 9 400 | 9 400 |
| Cooling Zone K | Nm$^3$/min | | | | | | | 27 000 |
| To Cyclone M$_1$ | m$^3$/min | | 8 600 | | | | | |
| To Cyclone M | m$^3$/min | | 24 000 | 24 000 | 24 000 | 16 400 | 24 300 | 24 000 |
| To Scrubber W | m$^3$/min | (43 400) | 10 000 | 18 600 | 25 900 | 10 000 | 24 300 | 18 600 |
| To Scruber W | % | (100) | 23 | 43 | 60 | 23 | 56 | 43 |
| To Electro-filter EF | m$^3$/min | 43 400 | | | 25 900 | 26 400 | 37 000 | 52 400 |
| To Electro-filter EF | % | 100 | | | 60 | 61 | 85 | 121 |
| Waste Gas Temperatures: | | | | | | | | |
| Sintering Zone Z+S | °C | 60 | 60 | 60 | 60 | 60 | 60 | 60 |
| Burning Zone D | °C | 340 | 340 | 340 | 340 | 340 | 340 | 340 |
| Cooling Zone K | °C | | | | | | | 220 |
| To Cyclone M$_1$ | °C | | 60 | | | | | |
| To Cyclone M | °C | | 340 | 340 | 340 | 340 | 230 | 340 |
| To Scrubber W | °C | | 60 | 60 | 110 | 60 | 230 | 60 |
| To Scrubber W | °C | | 50 | 50 | 53 | 50 | 60 | 50 |
| To Electro-filter EF | °C | 178 | | | 110 | 110 | 110 | |
| To Flue | °C | 178 | 55 | 50 | 53 | 110 | 110 | 220 |
| Reduced Pressure Sintering Belt: | | | | | | | | |
| Sintering Zone Z+S | mm Water Gage | 1 400 | 1 400 | 1 400 | 1 400 | 1 400 | 1 400 | 1 400 |

-continued

Treatment of Waste Gases According to the Process Illustrated in FIGS. 1 to 7

| Process According to Figures: | | 1 | 2 | 3 | 4 | 5 | 6 | 7 |
|---|---|---|---|---|---|---|---|---|
| Burning Zone D | mm Water Gage | 1 400 | 1 100 | 1 100 | 1 100 | 1 100 | 1 100 | 1 100 |
| Cooling Zone K | mm Water Gage | | | | | | | 600 |
| $SO_2$ Content: | | | | | | | | |
| Total Produced (1.5 g/Nm³) | t/h | 2.0 | 2.0 | 2.0 | 2.0 | 2.0 | 2.0 | 2.0 |
| Portion to Scrubber W | % | | 90 | 100 | 100 | 80 | 80 | 100 |
| To Scrubber W | t/h | | 1.8 | 2.0 | 2.0 | 1.6 | 1.6 | 2.0 |
| From Scrubber W (90%) | t/h | | 0.18 | 0.2 | 0.2 | 0.16 | 0.16 | 0.2 |
| To Flue | t/h | 2.0 | 0.38 | 0.2 | 0.2 | 0.56 | 0.56 | 0.2 |
| To Flue | % | 100 | 19 | 10 | 10 | 28 | 28 | 10 |
| Dust Content: | | | | | | | | |
| To Cyclone $M_1$ | g/Nm³ | | 0.5 | | | | | |
| From Cyclone $M_1$ | g/Nm³ | | 0.2 | | | | | |
| To Cyclone M | g/Nm³ | | 5 | 5 | 5 | 5 | 3 | 5 |
| From Cyclone M | g/Nm³ | | 0.5 | 0.5 | 0.5 | 0.5 | 0.5 | 0.5 |
| To Scrubber W | g/Nm³ | | 0.5 | 0.5 | 0.15 | 0.5 | 0.5 | 0.5 |
| From Scruber W | g/Nm³ | | 0.10 | 0.15 | 0.15 | 0.3 | 0.3 | 0.3 |
| To Electro-filter EF | g/Nm³ | 2.5 | | | 0.5 | 1.5 | 1.5 | 3.0 |
| From Electro-filter EF | g/Nm³ | 0.15 | | | 0.15 | 0.15 | 0.15 | 0.15 |
| To Flue | g/Nm³ | 0.15 | 0.15 | 0.15 | 0.15 | 0.15 | 0.15 | 0.15 |
| To Flue | t/h | 0.2 | 0.12 | 0.12 | 0.135 | 0.135 | 0.20 | 0.24 |
| To Flue Compared with Figure 1 | % | 100 | 60 | 60 | 68 | 68 | 100 | 120 |
| Relative Electro-Filter Size: | | | | | | | | |
| Compared to Figure 1 | % | 100 | | | 50 | 50 | 70 | 100 |
| Relative Scrubber Size: | | | | | | | | |
| Compared to Figure 1 | % | | 100 | 25 | 45 | 60 | 25 | 55 | 45 |

What is claimed is:

1. A method for cleaning waste gases from dust and gaseous or vaporous contaminants generated from an at least partially covered traveling grate-type sintering line wherein a sinter cake is produced by sintering a fine grained charge mixture of ore and solid fuel, the sintering line comprising an ignition zone, a sintering zone and a burning zone, said method comprising:
   returning process gas containing at least about 16 percent oxygen from the burning zone to the sintering zone, the sintering zone being defined as that section of the sintering line wherein the sinter front passes through the charge mixture and wherein substantially all of the moisture in the charge mixture is expelled and the average waste gas temperature is from about 50° C. to about 70° C. and the burning zone being defined as that section of the sintering line immediately following the sintering zone and wherein the sinter front passes down through the charge mixture until the sinter front reaches the grate and wherein the waste gas temperature reaches a maximum shortly before passage of the sintered mixture from said burning zone;
   passing the process gas returned from the burning zone through dust collector means thereafter through fan means and thence downwardly through the charge mixture in the sintering zone;
   scrubbing at least that portion of the waste gas emanating from the latter third of the sintering zone thereby cleaning that portion of the waste gas from gaseous or vaporous contaminants; and
   passing at least that portion of the waste gas emanating from the remainder of the sintering zone and from the ignition zone through dust collector means and cleaning that portion from dust.

2. The method of claim 1 wherein substantially all of the waste gas emanating from the sintering zone is scrubbed.

3. The method of claim 1 wherein the waste gas emanating from the sintering zone is passed through dust collector means prior to scrubbing.

4. The method of claim 1 wherein the waste gas emanating from the latter third of the sintering zone is scrubbed, mixed with the remaining waste gas from the sintering zone and a partial flow of waste gas emanating from the latter portion of the burning zone, the gas mixture being passed through electrostatic precipitator means.

5. The process of claim 1 wherein the sintering line further comprises a cooling zone immediately following said burning zone, the sinter charge being cooled in the cooling zone with the scrubbed waste gas from the sintering zone.

* * * * *